United States Patent

Tompkins

[11] 3,762,139
[45] Oct. 2, 1973

[54] SHAKER UNIT
[75] Inventor: Neil R. Tompkins, Yuba City, Calif.
[73] Assignee: Halsey Harvester & Supply Co., Inc., Colusa, Calif.
[22] Filed: Sept. 25, 1972
[21] Appl. No.: 291,670

[52] U.S. Cl. .......................................... 56/328 TS
[51] Int. Cl. .......................................... A01g 19/00
[58] Field of Search ................................. 56/328 TS

[56] References Cited
UNITED STATES PATENTS

| | | | |
|---|---|---|---|
| 3,596,455 | 8/1971 | Adrian | 56/328 TS X |
| 3,548,578 | 12/1970 | Shipley, Jr. | 56/328 TS |
| 3,555,799 | 1/1971 | Gerrans | 56/328 TS |
| 3,477,216 | 11/1969 | Martin | 56/328 TS |

Primary Examiner—Louis G. Mancene
Assistant Examiner—J. A. Oliff
Attorney—Herbert A. Huebner et al.

[57] ABSTRACT

A mechanical shaker unit particularly suited for use in dislodging tree-borne crops such as fruits and nuts. The unit includes a frame, supported by a journal coupled to the distal end of a transportable boom, having provided therein a forge generating device for imparting vibratory forces to the frame, and a pair of clamping arms, pivotally coupled at the opposite sides of the frame, having a pair of pivotally supported pads mounted at the distal ends thereof for receiving therebetween a limb or the trunk of a selected tree, and linkage for maintaining the pads in a substantially parallel relationship as the arms are pivotally displaced as a clamping force is applied to the surface of a selected portion of a tree.

8 Claims, 10 Drawing Figures

PATENTED OCT 2 1973

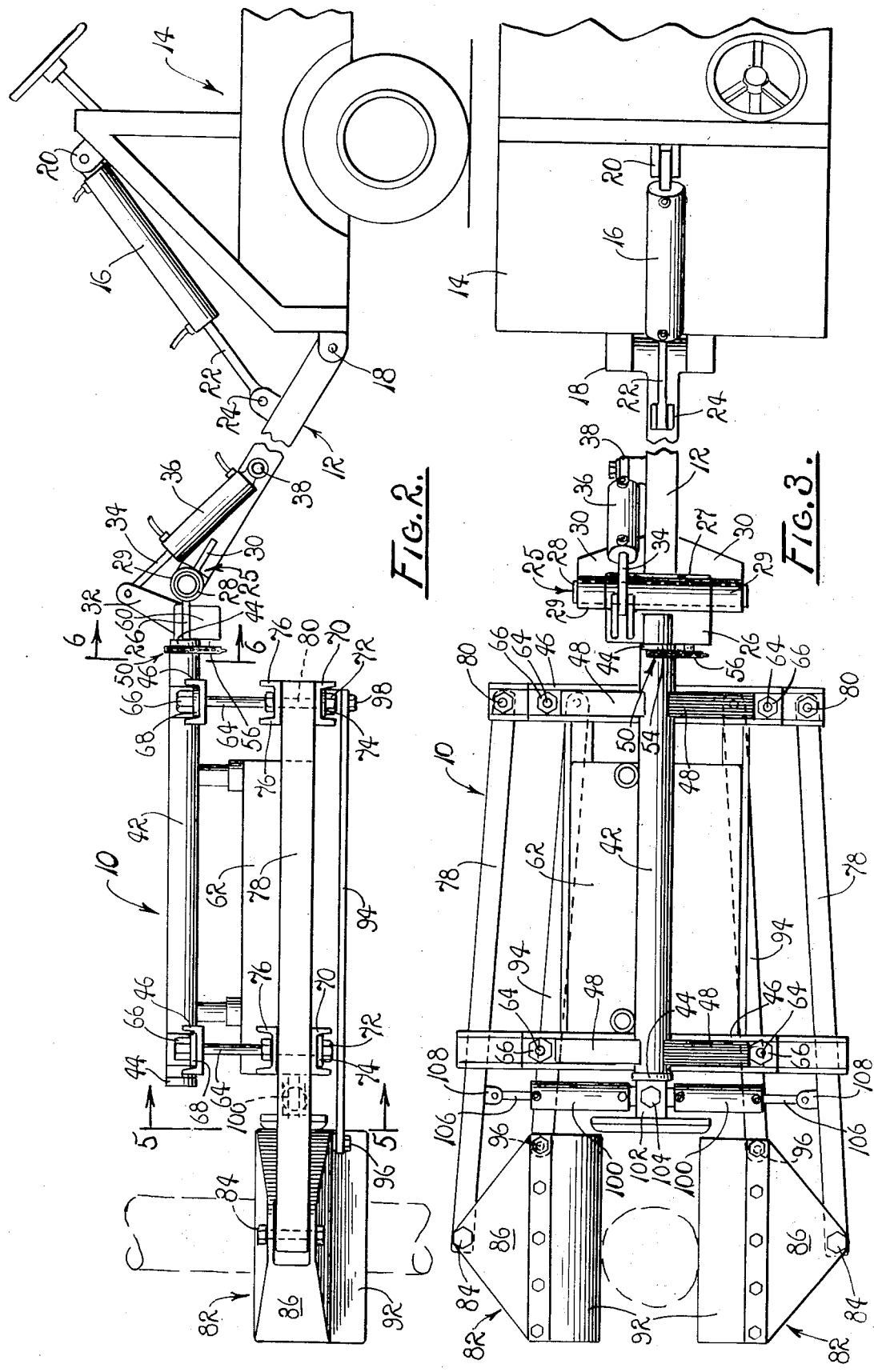

SHAKER UNIT

BACKGROUND OF THE INVENTION

The invention relates to shakers and more particularly to a mechanical shaker unit for use in harvesting fruits, nuts and the like.

Heretofore, various mechanical shakers have been employed in harvesting crops, such as fruit and nut crops. One such shaker is disclosed in applicant's copending application, Ser. No. 221,893, filed Jan. 31, 1972.

Shaker units heretofore have been supported at the distal ends of mobile booms in order to facilitate a re-positioning of the shaker units relative to selected crop-bearing trees, such as fruit and nut trees, preparatory to the harvesting of the crops, through a shaking of the trees.

While shaker units of the type hereinbefore mentioned often function quite satisfactorily, it is important to note that frequently a shaker unit must be attached to a laterally extended tree limb, or other portions of the tree not vertically oriented, in order to apply a desired vibratory shaking motion to the tree. Since the shaker units heretofore employed are specifically designed to grasp vertically oriented portions of a tree, such as the trunk of a tree, difficulty is encountered when attempting to grasp portions of the tree which deviate from a vertical orientation. Accordingly, it can be appreciated that shaker units heretofore employed lack a versatility often found desirable in harvesting fruit, nut and similar tree-borne crops.

As is also quite common, so-called shaker pads are provided at the distal ends of a pair of arms supported for movement in mutually opposed directions. Hence, the tree is grasped or "pinched" between the pair of pads as a closing motion is imparted to the arms. Of course, where a tree to be shaken is of a variety having a rather tough bark, the specific arrangement of the pads is not particularly critical, so long as the tree is secured therebetween. It has, however, been found that crop-bearing trees lack uniformity in the tenacity with which the crops adhere to the trees. Furthermore, the toughness of the bark varies greatly between the trees of the various species and varieties. Therefore, the bark of a given tree may suffer substantial injury when pads of the aforementioned type are employed since there is a distinct tendency to cause the grasped portion to "squeeze-out" from between the pads. This tendency is particularly critical in those instances where the arms are displaced with a scissor motion so that force vectors of the applied clamping force are angularly related at less than 180°. It can, therefore, be appreciated that the use of shaker units in harvesting tenacious crops from trees having bark readily susceptible to injury has been substantially impeded, due to the fact that the pads often do not apply opposed force loads to the portion of the tree grasped therebetween, while a vigorous shaking is applied for dislodging the crop.

Accordingly, it is to be understood that shaker units heretofore employed lack a degree of versatility found highly desirable in the harvesting of tree-borne crops.

It is therefore the purpose of the instant invention to provide an improved shaker unit having increased versatility for use in harvesting tree-borne crops.

OBJECTS AND SUMMARY OF THE INVENTION

It is therefore an object of the instant invention to provide an improved shaker unit.

It is another object to provide an improved mechanical shaker unit for use in shake-harvesting a variety of crops.

It is another object to provide an improved mechanical shaker unit for use in harvesting fruits, nuts and the like, from trees lacking uniformity in size, configuration, and toughness of bark characteristics.

It is another object to provide a shaker unit having a capability of grasping inclined portions of trees between a pair of pads supported by a pair of pivotal arms mounted for pivotal motion at opposite sides of the unit.

It is another object to provide a pair of pads supported at the distal ends of a pair of pivotal arms and capable of grasping therebetween and applying substantially opposed forces to a selected portion of a tree, regardless of the diameter thereof.

These and other objects and advantages are achieved through the use of a mechanical shaker unit journaled for rotation about an axis paralleling the longitudinal axis of the unit, a pair of coplanar arms pivotally supported at each side of said unit for mutually opposed displacement and a linkage approximating a parallel linkage for substantially maintaining the pads in a relatively fixed mutual relationship, whereby force vectors of the clamping force are in substantial opposition, regardless of the diameter of the portion of the tree being clamped.

BRIEF DESCRIPTION OF THE DRAWINGS

FIG. 2 is a side elevational view, on an enlarged scale, of the shaker unit shown in FIG. 1.

FIG. 3 is a top plan view of the shaker unit.

DESCRIPTION OF THE PREFERRED EMBODIMENT

Figure 1:
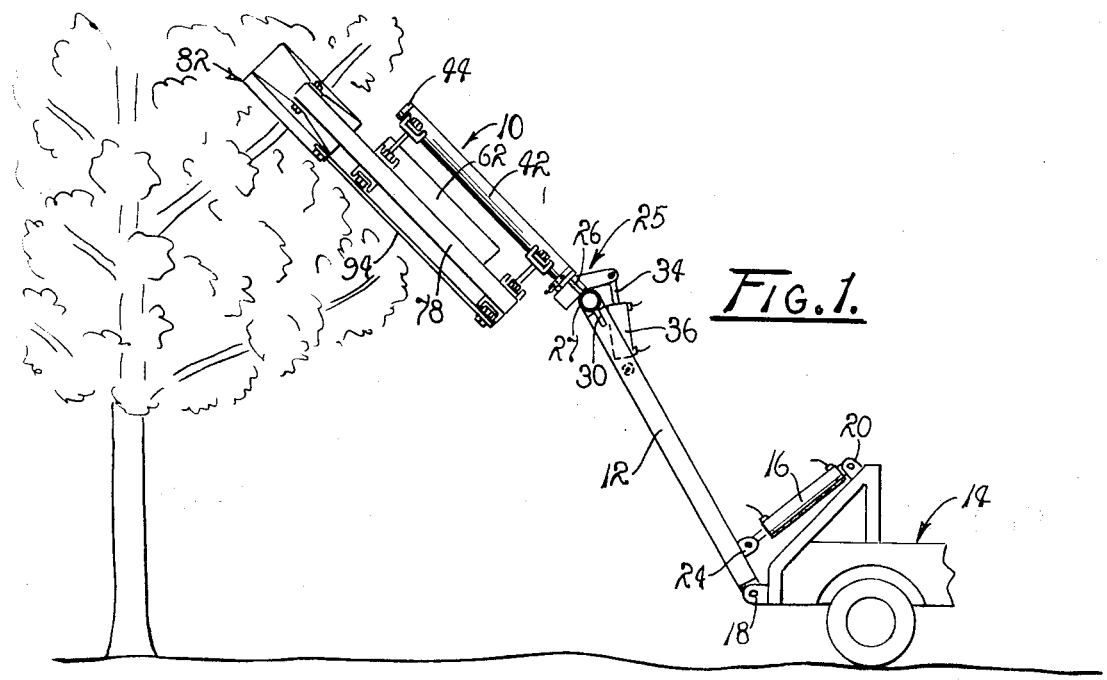
FIG. 1 is a fragmented view illustrating an operative environment for a shaker unit which embodies the principles of the instant invention.
Figure 8:
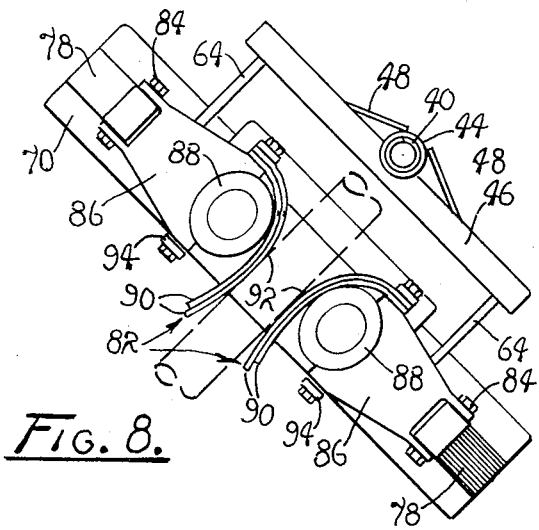
FIGS. 8 and 9 are end elevational views of the shaker unit collectively illustrating alternate positions attainable by the unit for grasping portions of trees angularly related to a vertical plane.
Figure 9:
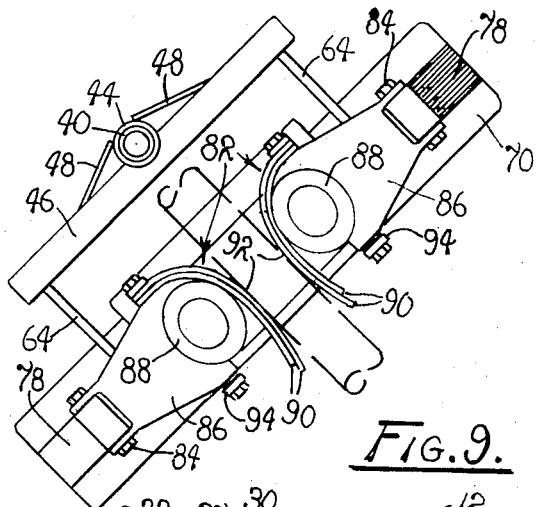
Figure 10:
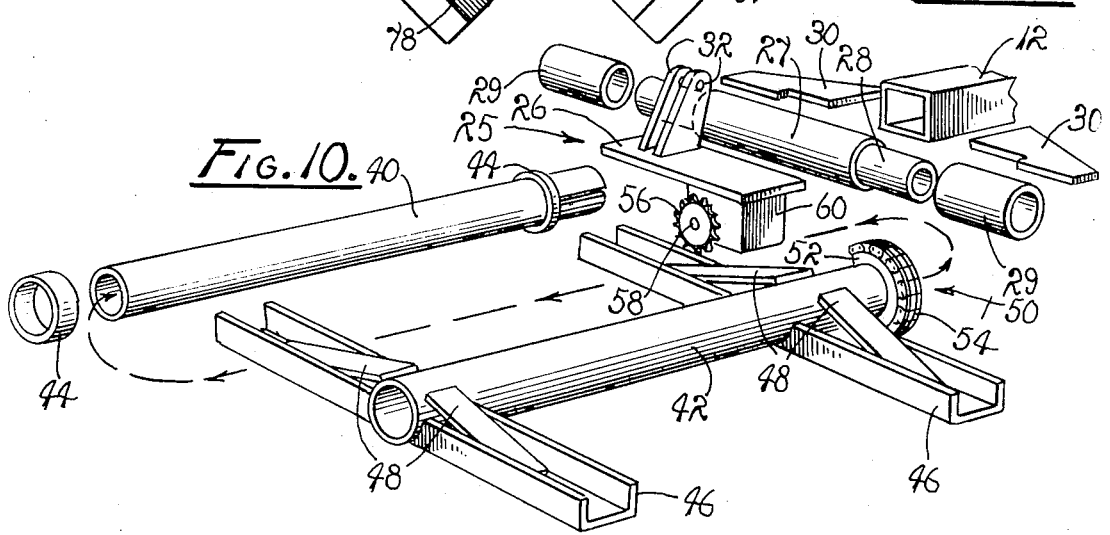
FIG. 10 is an exploded perspective view of supporting structure provided for said unit.

Referring now to the drawings wherein like reference characters designate like or corresponding parts throughout the several views, there is shown in FIG. 1 a shaker unit, generally designated 10, which embodies the principles of the instant invention.

As shown, the unit 10 is supported at the distal end of a mobile boom 12, which, in turn, is supported for pivotal displacement in a vertical plane. In practice, a transporting vehicle, generally designated 14, is provided for supporting the boom. It will, of course, be appreciated that the particular configuration of the vehicle 14 is a matter of choice and that the boom 12 is coupled thereto and supported thereby for pivotal displacement in any suitable manner. Preferably, however, the base of the boom is journaled to the vehicle 14 and is driven in pivotal displacement by a selectively operable hydraulic ram 16.

At this juncture, it is noted that a suitable hydraulic circuit, not shown, is employed in activating various hereinafter described actuators in a known manner consistent with the principles of hydraulic circuitry. It is to be further understood that suitable selector valves are provided to be employed in controlling the aforementioned actuators. Since hydraulic circuitry including pumps, reservoirs, selector valves and the like are well known and the specific circuit employed forms no part of the instant invention, a detailed description of the circuit within which the aforementioned actuators are coupled is omitted in the interest of brevity.

As shown in FIGS. 2 and 3, the boom 12 is supported for pivotal displacement by a journal pin 18 coupled to the vehicle 14 in any suitable manner. Similarly, the ram 16 is pinned to a bracket 20, fixed to the vehicle 14, while the distal end of the ram's output shaft, designated 22, is pinned to the boom 12 through a suitably provided clevis coupling 24. It should, therefore, be apparent that by imparting reciprocating motion to the output shaft 22 of the ram 16, oscillatory motion is imparted to the boom 12.

The shaker unit 10 is pivotally coupled to the boom 12 by a journaled mount 25. The mount 25 includes a plate 26 rigidly fixed to a sleeve 27 extended transversely of the longitudinal axis of the boom 12. Extended through the sleeve 27 is a journal pin 28, the opposite ends of which are received within a pair of coaxially related mutually spaced sleeves 29. As a practical matter, the sleeves 29 are fixed to the pin 28 through a use of welds, retainer collars, pins, and other suitable devices.

Accordingly, it should be apparent that the plate 26, fixed to the sleeve 27, is supported for rotation about an axis coincident with the longitudinal axis of the journal pin 28. The sleeves 29, in turn, are rigidly fixed to the distal end of the boom 12 by a pair of gussets 30 welded to both the sleeves 29 and the distal end of the boom 12. Of course, other suitable means can be employed in coupling the mount 25 with the distal end of the boom 12 so long as a pivotal rotation of the mount is accommodated. For example, the plate 26 can be mounted to the sleeves 29, rather than the plate 26, and the sleeves then permitted to rotate relative to the journal pin 28. In such instances the sleeve 27 is rigidly fixed to the distal end of the boom 12.

In any event, it is to be understood that the mount 25 is afforded rotation about an axis transversely related to the longitudinal axis of the boom 12. In order to impart rotation to the mount 25, there is provided a pair of parallel plates 32 extended from the plate 26. These plates collectively establish a lever arm projected upwardly from the plate. To the distal end of the thus formed lever arm there is pinned the distal end of an output shaft 34 of an hydraulic ram 36. The ram 36 is pinned at its heel to the boom 12 by a pivotal coupling 38. Consequently, rectilinear reciprocation of the shaft 34 serves to impart oscillatory motion to the mount 25, about the longitudinal axis of the journal pin 28.

From the plate 26 of the mount 25, there is extended a cantilevered journal pin 40. The longitudinal axis of the pin 40, when projected, intersects the longitudinal axis of the journal pin 28. This journal pin, in turn, telescopically receives an elongated sleeve 42 in a manner such that the sleeve 42 is supported by the pin 40 for rotation about an axis coincident with the longitudinal axis thereof. It is to be understood, of course, that the sleeve 42 is secured against axial displacement relative to the pin 40 by any suitable thrust bearings, designated 44, fixed to the opposite ends of the journal pin 40, in juxtaposition with the ends of the sleeve 42.

To the sleeve 42 there is rigidly secured a pair of parallel and mutually spaced hangers 46. The hangers 46 are welded near their midpoints to the sleeve 42 in a transverse relationship therewith. As a practical matter, the hangers 46 are formed of suitable lengths of channel iron and are further supported by a plurality of suitably inclined brace members 48. Thus rigidity is imparted to the hangers 46.

In order to impart rotation to the unit 10, there is welded about the periphery of the sleeve 42, adjacent the plate 26, an arcuate segment of a chain segment, generally designated 50. As a practical matter, the chain segment 50 includes a base 52 of an arcuate configuration welded to the sleeve 42. Along an arcuate periphery of the base 52 there is welded a length of sprocket chain 54.

Figure 6:
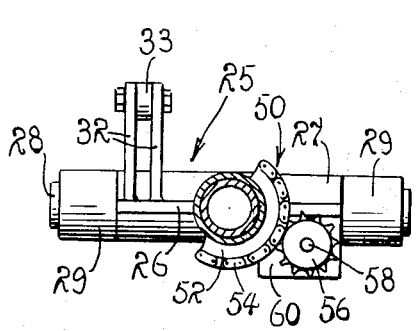
FIG. 6 is a cross sectional view taken generally along line 6—6 of FIG. 2.
Figure 7:
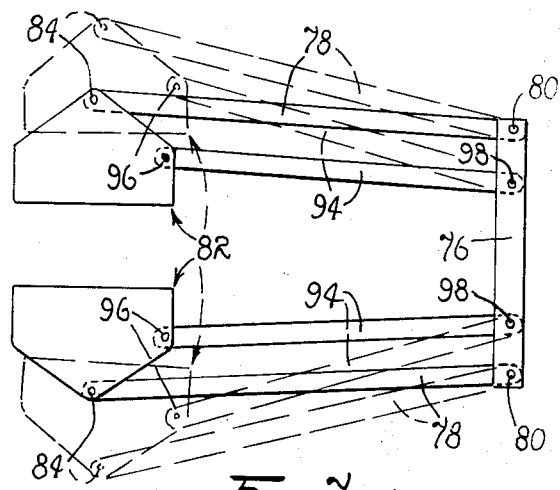
FIG. 7 is a schematic view illustrating linkage employed in maintaining the shaker pads of the unit in a substantially constant mutual orientation as the pads are displaced in mutually opposed directions.

Meshed with the sprocket chain 54 is a driving sprocket 56. This sprocket is mounted at the output end of a drive shaft 58, FIG. 6, driven by a selectively reversible hydraulic motor 60. The motor 60, in turn, is suspended from the plate 26 of the mount 25 in any suitable manner. It is to be understood that simply by reversing the operation of the motor 60 a reversed rotation is imposed on the sprocket 56. Thus an oscillating rotation of the sleeve relative to the journal pin 40 readily can be achieved simply by reversely operating the motor 60.

As best illustrated in FIG. 2, the unit 10 also includes a housing 62 for a force generating system, not shown. The force generating system is employed in imparting vibratory motion to the unit 10 when energized. As a practical matter, the force generating system disclosed in applicant's hereinbefore mentioned copending application, Ser. No. 221,893, filed Jan. 31, 1972, serves quite satisfactorily for this purpose. As disclosed in the aforementioned patent application, the force generating system includes an energy wheel unit supported upon a bearing pin coupled between the walls of the housing 62. The energy wheel unit employs a pair of coaxially aligned energy wheels of differing diameters, each bearing at its periphery a selected mass. The wheels are driven by a common belt, but at different angular velocities so that the algebraic sum of the forces developed by the rotating masses serves to impart a vibratory motion to the housing 62. In view of the fact that the force generating system employed for imparting vibratory motion to the shaker unit 10 forms no specific part of the instant invention, a more detailed description thereof is omitted in the interest of brevity.

In practice, the housing 62 is suspended from the hangers 46 by a plurality of hanger bolts 64 extended vertically through the end portions of each of the hangers 46. The hanger bolts 64 are secured by a suitable nut-and-washer combination, designated 66, to the hangers 46 with a shock-absorbing grommet 68 interposed therebetween.

In order to suspend the housing 62 from the hangers 46, there is provided along the lowermost surface of the housing a pair of transverse stringers 70. These stringers are of an inverted U-shaped configuration having suitably formed openings, not designated, through which the hanger bolts 64 are extended. Immediately beneath the stringers 70 the hanger bolts 64 are provided with a suitable nut-and-washer combination 72, also having interposed therebetween a suitable shock-absorbing grommet 74 quite similar to the grommet 68. Hence, it can be appreciated that the housing 62 is supported for oscillation about the journal pin 28 as well as the journal pin 40.

The housing 62 is further provided with a mutually spaced pair of transversely oriented beams 76. These beams also are formed of channel iron and are extended laterally from the housing in coplanar relation with the stringers 70. Preferably, the beams 76 extend through the housing 62 and are welded thereto whereby suitable rigidity is afforded. The beams 76 are suitably spaced vertically from the transverse stringers 70 to receive therebetween a pair of clamping arms 78. As illustrated in FIG. 2, the clamping arms 78 are pinned between the extended ends of the rearmost stringer 70 and beam 76 by a bushing pin 80. Each of the arms 78 is also received between the ends of the forwardmost stringer 70 and beam 76. However, the arms 78 are free to move between the end portions of the forwardmost beam and stringer in a sliding fashion so that a simultaneous pivotal displacement of the arms about the bushing pins 80 is accommodated.

Figure 4:
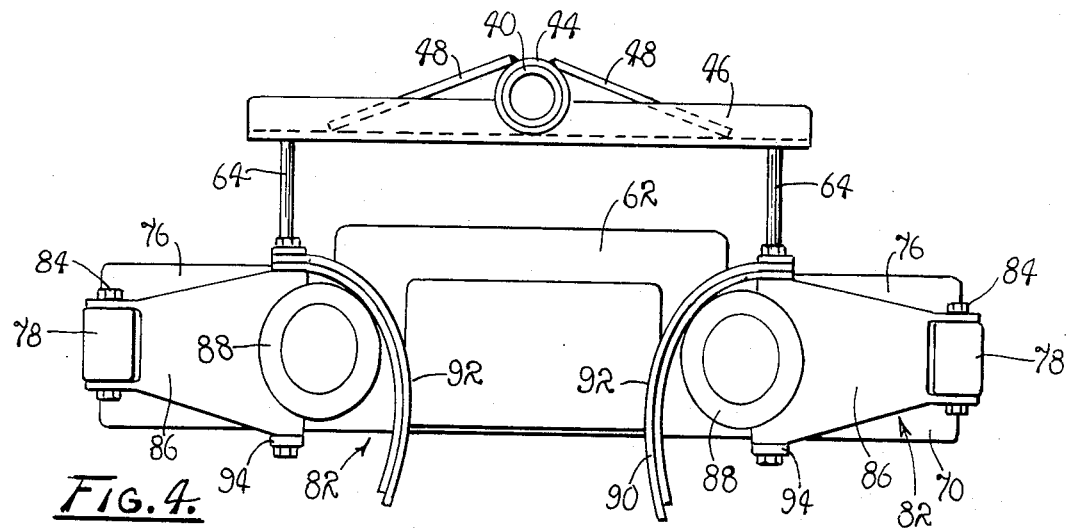
FIG. 4 is a front elevational view of the shaker unit.
Figure 5:
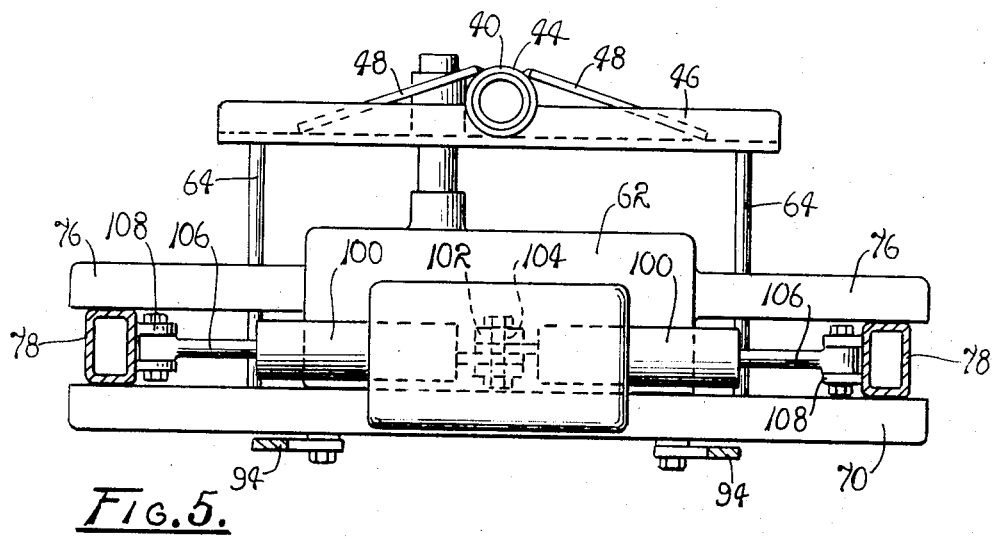
FIG. 5 is a cross sectional view taken generally along line 5—5 of FIG. 2.

Each of the arms, at its forwardmost or distal end, serves to support a clamping pad assembly, generally designated 82, pivotally coupled thereto by a bushing pin 84. The clamping pad assemblies are of any suitable design and construction. In practice, the pad assemblies 82 include a base 86 to which is mounted a resilient, tubular member 88, FIG. 4, having an overlying skirt 90 for minimizing bark damage during shaking operations. The opposed faces, designated 92, of the pads are maintained in substantial parallelism so that a squeezing-out effect will not occur as a portion of the tree is clamped therebetween. To achieve this, each of the clamping pad assemblies 82 also is coupled with the rearmost transverse stringer 70 through a link 94.

The link 94 is pinned at its forward end to the base 86, by a pin 96, and to the rearmost transverse stringer 70 by a pin 98. It will, therefore, be appreciated that the links 94 cooperate with the clamping arms 78 to substantially establish a parallel linkage for maintaining the faces 92 of the clamping pad assemblies 82 in substantial parallelism as the clamping arms 78 are pivotally displaced about the pins 80. For reasons which should be apparent, the clamping pad assemblies 82 thus are caused to act in substantial opposition as they apply a clamping force to an engaged portion of a tree disposed between the opposite faces 92. Since the clamping pad assemblies 82 apply force to the engaged portion of the tree in substantial opposition, the tendency fo squeeze-out the portion is reduced or even eliminated. Thus, the likelihood of injury to the tree, caused by bark being "slipped" from the wood, is substantially reduced.

Pivotal motion is imparted to the arms 78 through a pair of coaxially aligned hydraulic rams 100. The rams 100 are pinned at their heels to a common bracket 102 welded or otherwise rigidly affixed to the housing 62 by a common pin 104. Each of the arms 100 includes a reciprocable output shaft 106 pinned at its distal end, through a suitable clevis coupling 108, to one of the arms 78. In practice, each of the clevis couplings 108 is welded to an arm 78 at a point such that the coaxial relationship established between the rams 100 is substantially maintained as the shafts 106 are driven in reciprocation.

It will therefore be appreciated that by selectively pressurizing the pair of hydraulic rams 100 pivotal displacement of the clamping arms 78 is achieved for causing the clamping pad assemblies 82 to engage therebetween surfaces of a portion of a tree to be shaken. The force with which the pad assemblies 82 are caused to engage the surface of the tree, of course, is determined by the pressure developed by the hydraulic system within which the pair of rams 100 is coupled. Of course, in view of the fact that the pad assemblies 82 tend to act in substantial opposition, the vibratory force generated by the force generating system and applied to the surface of the tree can be increased sufficiently to dislodge crops having a high degree of tenacity without an attendant increase in probable injury to the tree.

OPERATION

It is believed that in view of the foregoing description, the operation of the device will be readily understood and it will be briefly reviewed at this point.

It should be apparent that the vehicle 14 employed for transporting the unit 10 is suitable and sufficient.

The unit 10 supported by the boom 12 is elevated about the journal pin 18 simply by selectively pressurizing the double-acting hydraulic ram 16. As the boom 12 is pivoted about the journal pin, the shaker unit 10 is elevated to an appropriate height whereupon the vehicle is advanced toward the tree to be shaken. Of course, the selector valves coupled within the hydraulic system, as hereinbefore mentioned, are suitably manipulated for causing the shafts 106 of the ram 100 to extend for separating the clamping pad assemblies 82. The vehicle 14 is then positioned at a point such that a portion of the tree shaken is interposed between the pads.

At this juncture of the operation, a selector valve is manipulated for reversing the displacement of the shaft 106 of the double-acting ram 100 causing the pad assemblies 82 to engage and grip a portion of the surface of the tree to be shaken. Thereupon, the motor for the force generating system is activated, whereupon a shaking motion is imparted to the tree for causing fruit, or nuts, borne thereby to be dislodged. Once shaking has been completed, the shafts 102 are extended for releasing the grasped portion of the tree from between the pad assemblies 82. Since the pad assemblies are pivotally supported by the pins 84 and their relative orientation controlled by the link 94, the clamping forces are applied to the surface of the tree in substantial opposition so that the bark suffers minimal injury, even during quite vigorous shaking operations.

As frequently occurs, it is desirable to grasp a portion of a tree deviating from a vertical orientation. Such portions of trees include an inclined section of the tree trunk or even a limb thereof. To accommodate a grasping of such a portion, the motor 60 is selectively energized for driving the sprocket 56 in a predetermined direction. The sprocket 56 then advances the sprocket chain 50 for imparting angular displacement of the shaker unit 10 about an axis of rotation defined by the longitudinal axis of the journal pin 40. Since the motor 60 is of a suitable design which accommodates a reversing thereof, the inclination of the unit 10, about the axis of the journal pin 40, can readily be controlled for thus suitably positioning the clamping pad assemblies 82.

Additionally, the unit 10 can be inclined about an axis normal to the axis of the journal pin 40 for further aiding in the positioning of the shaker unit 10. To achieve this inclination, the double-acting ram 36 is appropriately energized for forcing its shaft 34 in a predetermined direction for thereby displacing the bracket 32, whereupon the mount 25 is caused to rotate about the axis of the journal pin 28. Thus a suitable inclination is imposed on the shaker 10.

In view of the foregoing, it should readily be apparent that the shaker unit 10 is supported for oscillatory motion about a plurality of axes of rotation so that a suitable orientation of the unit preparatory to a shaking operation is accommodated. This, of course, permits the unit 10 to be positioned at optimum locations whereby the vibratory motion required for shaking can be minimized.

In view of the foregoing, it is to be understood that the shaker unit 10 of the instant invention provides a practical solution to the perplexing problems heretofore encountered in imparting a high degree of versatility to shaker units for use in harvesting numerous tree crops which lack uniformity in toughness of bark and crop tenacity.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. An improved shaker unit comprising:
  A. a shaker frame;
  B. means supporting said frame for oscillatory motion about an axis of rotation substantially paralleling a given axis of symmetry of said frame;
  C. a pair of clamping arms and means pivotally coupling said arms at their bases with said frame at the opposite sides of said axis of symmetry;
  D. means including a pair of mutually spaced shaker pads, having faces disposed in mutual opposition, supported at the distal end of said arms for releasably securing a body between said faces; and
  E. means for imparting pivotal motion to the arms, including a pair of substantially coaxially aligned, oppositely extended hydraulic rams, each having a barrel pinned at its base to said frame and an axially movable shaft seated in the barrel and connected at its distal end to one of said clamping arms, for simultaneously imparting oppositely directed, pivotal motion to the arms as axial motion simultaneously is imparted to the shafts of said pair of rams.

2. The shaker unit of claim 1 wherein said means supporting said frame for oscillatory motion includes a journal supporting said frame and means for rotating said frame about said journal.

3. The shaker unit of claim 2 wherein said means for rotating said frame includes a selectively operable hydraulic motor having a driven sprocket and an arcuate length of chain coupled with said frame and meshed with said sprocket.

4. The shaker unit of claim 1 further comprising means for maintaining the faces of said pads in substantial parallelism as pivotal motion is imparted to said arms.

5. An improved shaker unit including:
  A. a shaker frame;
  B. means for imparting vibratory motion to said frame;
  C. a pair of arms pivotally coupled to the frame at the opposite sides thereof;
  D. a pair of pad assemblies having opposed faces arranged in substantially mutual parallelism, each pad assembly of said pair being pivotally coupled to the distal end of one of said arms;
  E. drive means for imparting pivotal motion to said arms; and
  F. means including a pair of links, each link of said pair being extended between said frame and one of said pad assemblies and pinned thereto in substantial parallelism with one of said arms in a manner such that said arms and said links collectively define a pair of parallel linkages for maintaining said opposed faces in substantially mutual parallelism as pivotal motion is imparted to said arms.

6. The shaker unit of claim 5 further including:
  A. a journal supporting said frame for oscillatory motion about an axis of rotation substantially paralleling the longitudinal axis of the frame; and
  B. means for imparting oscillatory rotation to said frame.

7. The shaker unit of claim 6 wherein said drive means comprises a pair of coaxially aligned hydraulic pistons for imparting pivotal motion to said arms.

8. The unit of claim 7 wherein said means for imparting oscillatory motion to said frame includes a selectively operable hydraulic motor, and means coupled in a driven relation with said motor and in a driving relation with said frame responsive to an operation of said motor for imparting oscillatory motion to the frame.

* * * * *